(12) United States Patent
Hornberger et al.

(10) Patent No.: US 7,049,776 B2
(45) Date of Patent: May 23, 2006

(54) ROTOR-POSITION SENSOR ASSEMBLY AND METHOD FOR DETECTING A ROTOR POSITION

(75) Inventors: Jörg Hornberger, Dornstetten (DE); Hermann Rappenecker, Vöhrenbach (DE); Christian Rudel, Königsfeld (DE); Siegfried Schreiner, Villingen-Schwenningen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 10/533,265

(22) PCT Filed: Dec. 13, 2003

(86) PCT No.: PCT/EP03/14211

§ 371 (c)(1),
(2), (4) Date: Apr. 28, 2005

(87) PCT Pub. No.: WO2004/059830

PCT Pub. Date: Jul. 15, 2004

(65) Prior Publication Data

US 2006/0056821 A1  Mar. 16, 2006

(30) Foreign Application Priority Data

Dec. 31, 2002 (DE) ................................ 102 61 583

(51) Int. Cl.
*G05B 19/18* (2006.01)
(52) U.S. Cl. ...................... 318/569; 318/600; 318/604; 318/254
(58) Field of Classification Search ................ 318/254, 318/138, 439, 569, 600, 601–606; 388/928, 388/907.5
See application file for complete search history.

(56) References Cited

U.S. PATENT DOCUMENTS

| 4,748,387 | A |   | 5/1988 | Tanuma et al. .............. 318/254 |
| 4,772,815 | A | * | 9/1988 | Harned et al. .............. 310/171 |
| 5,089,733 | A |   | 2/1992 | Fukuoka ................... 310/67 R |

(Continued)

FOREIGN PATENT DOCUMENTS

DE  195 39 134  4/1997

(Continued)

OTHER PUBLICATIONS

Patent Abstracts of Japan, English abstract of JP 2002-165476 Kawamichi/Matsushita, published Jun. 7, 2002.

(Continued)

*Primary Examiner*—Rina Duda
(74) *Attorney, Agent, or Firm*—Milton Oliver, Esq.; Ware Fressola Van Der Sluys & Adolphson LLP

(57) ABSTRACT

An electric motor has a stator and an external rotor (40). Its external rotor (40) has a sensor magnet (54) having a plurality SP of sensor poles (55). The motor also has: at least one rotor position sensor (42, 44) for generating a rotor position signal and a rotor position evaluation arrangement for generating an absolute value for the rotor position, which apparatus comprises an A/D converter (144) having a resolution of at least two bits, the at least one rotor position sensor (42, 44) being connected to the A/D converter. In order to enable obtaining different digital values, even at rotational positions within the angle range of one sensor pole, each analog rotor position sensor signal is converted by the A/D converter into a digital value having at least two bits.

39 Claims, 19 Drawing Sheets

U.S. PATENT DOCUMENTS

| | | | | |
|---|---|---|---|---|
| 5,124,625 | A | * | 6/1992 | Wakabayashi ............... 318/603 |
| 5,134,404 | A | | 7/1992 | Peterson ..................... 341/116 |
| 5,291,112 | A | * | 3/1994 | Karidis et al. ........... 318/568.1 |
| 5,463,393 | A | | 10/1995 | Havlicsek ................... 341/115 |
| 5,892,339 | A | | 4/1999 | Park et al. .................. 318/254 |
| 6,018,318 | A | | 1/2000 | Schödlbauer ............... 342/442 |
| 6,400,109 | B1 | | 6/2002 | Helmut ....................... 318/439 |
| 6,489,761 | B1 | * | 12/2002 | Schroeder et al. ..... 324/207.25 |
| 6,614,223 | B1 | * | 9/2003 | Schroeder et al. ..... 324/207.22 |
| 6,745,116 | B1 | | 6/2004 | Takuma et al. ................ 701/41 |
| 6,774,599 | B1 | | 8/2004 | Ishii ........................... 318/652 |
| 2001/0048304 | A1 | | 12/2001 | Sato et al. |
| 2002/0011837 | A1 | | 1/2002 | Sato |
| 2002/0064063 | A1 | | 5/2002 | Kohara et al. |
| 2004/0004471 | A1 | | 1/2004 | Haas et al. |
| 2004/0059486 | A1 | | 3/2004 | Takuma et al. |

FOREIGN PATENT DOCUMENTS

DE        137 38 344       4/1998

OTHER PUBLICATIONS

Patent Abstracts of Japan, English abstract of JP 2001-336 912-A, Sato/Yazaki Corp. published Dec. 7, 2001.

Automotion, "Ethernet Powerlink"—interview w. Dr. Edwin Kiel (Jun.'03).

Edwin Kiel, "Anwendungspezifische Schaltkreise in der Drehstrom-Antriebstechnik" [ASICs in the AC-Drive Field], (1994 Doctoral Dissertation, Univ. Braunschweig, Germany), pp. 34-39, section 2.4: Sensors & Sensor Evaluation.

* cited by examiner

US 7,049,776 B2

ROTOR-POSITION SENSOR ASSEMBLY AND METHOD FOR DETECTING A ROTOR POSITION

CROSS-REFERENCE

This application is a section 371 of PCT/EP2003/014 211, filed 13 Dec. 2003. Published 14 Jul. 2004 as WO 2004-059 830-A3, claiming priority from German application 102 61 583.7, filed 31 Dec. 2002, the entire disclosure of which is hereby incorporated by reference.

FIELD OF THE INVENTION

The invention concerns a rotor position sensor arrangement and a method, in particular for an external-rotor motor, for sensing the rotor position.

BACKGROUND

U.S. Pat. No. 6,400,109 B1, Hans Helmut, discloses a rotor position sensor arrangement for an external-rotor motor in which the rotor position is sensed with the aid of digital Hall sensors.

In this context, each signal change of a signal generated by the digital Hall sensors indicates that a specific rotor position in the region of a change in the detected magnetic field has been reached, as well as the direction in which the change has taken place. A rotor position datum is thus obtained at discrete rotor positions.

SUMMARY OF THE INVENTION

It is therefore an object of the invention to make available a new rotor position arrangement and a new method for sensing the rotor position.

According to a first aspect of the invention, this object is achieved by generating, from at least one sensor, a respective rotor position signal and delivering the signal(s) to a rotor position evaluation arrangement which converts each analog signal into a digital value having a resolution of at least two bits.

Conversion of the rotor position signal into a digital value having a resolution of at least two bits makes it possible to obtain data from the rotor position signal, even within the angle range of a sensor pole.

According to a further aspect of the invention, the object is achieved by an electric motor having a stator, an external rotor with a sensor magnet having a plurality SP of sensor poles, at least one rotor position sensor for generating a respective rotor position signal, the output(s) of the sensor(s) being connected to an input of a rotor position evaluation apparatus which includes an A/D converter with a resolution of at least two bits.

The use of an A/D converter having a resolution of at least two bits makes it possible, in the context of an external rotor, to obtain data from the rotor position signal even within the angle range of a sensor pole.

Further details and advantageous refinements of the invention are evident from the exemplary embodiments, in no way to be understood as a limitation of the invention, that are described below and depicted in the drawings.

BRIEF FIGURE DESCRIPTION

FIG. 1 schematically depicts a two-pole rotor of an internal-rotor motor;

FIG. 2 schematically depicts a rotor position signal measured in the context of a rotor according to FIG. 1;

FIG. 3 schematically depicts a two-pole rotor of an external-rotor motor;

FIG. 4 schematically depicts a rotor position signal measured in the context of a rotor according to FIG. 3;

FIG. 5 schematically depicts an external-rotor motor having a 28-pole sensor magnet;

FIG. 6 schematically depicts the external-rotor motor of FIG. 5 in a developed depiction;

FIG. 7 schematically depicts a rotor position signal measured in the context of an external-rotor motor according to FIG. 5;

FIG. 8 schematically depicts one period of a rotor position signal;

FIG. 9 schematically depicts a normalization of the rotor position signal according to FIG. 8;

FIG. 10 schematically depicts the normalization procedure according to FIG. 9;

FIG. 11 schematically depicts a normalization procedure with a filtering operation;

Figure 14:
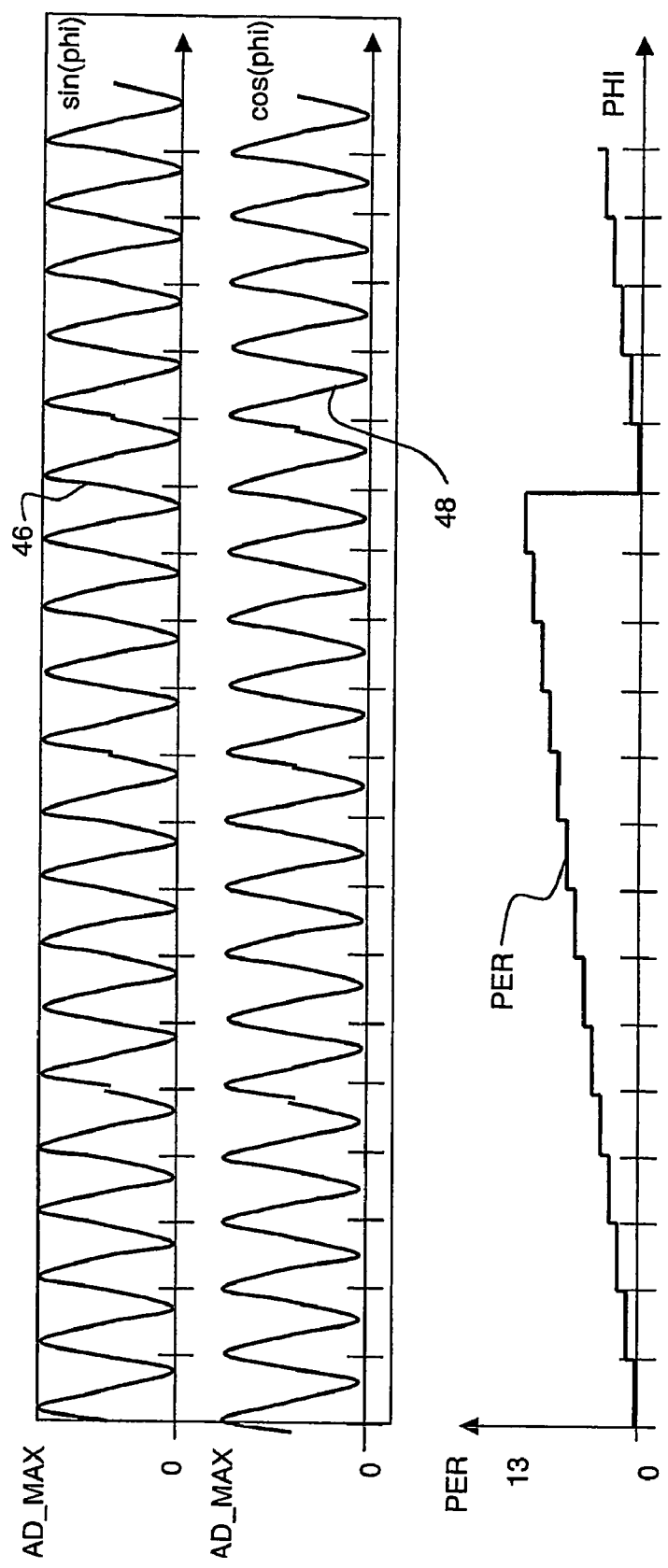
Figure 15:
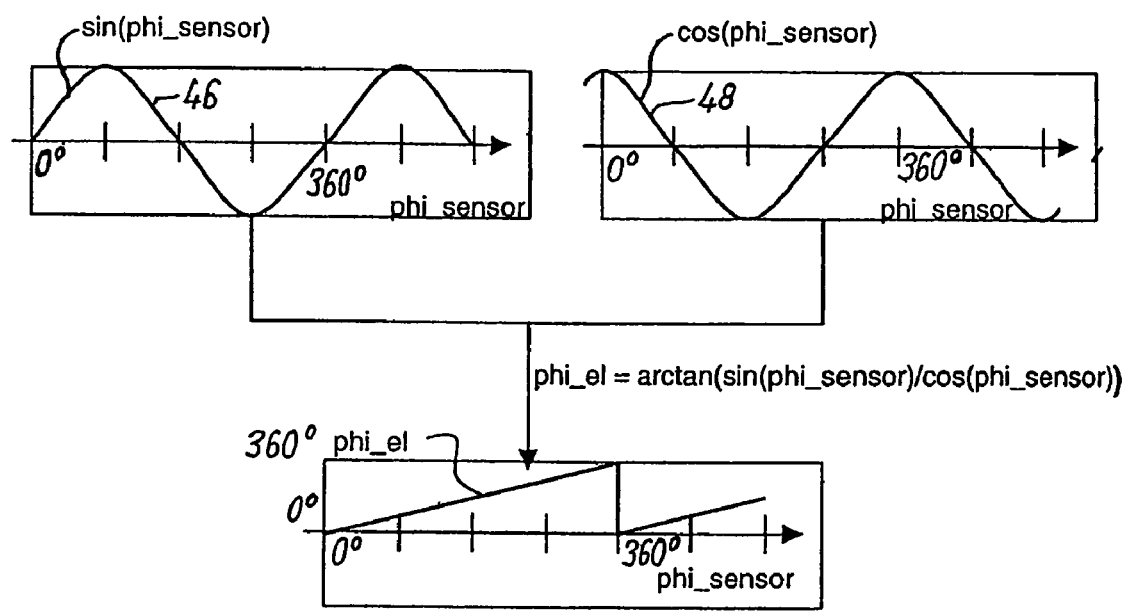
Figure 16:
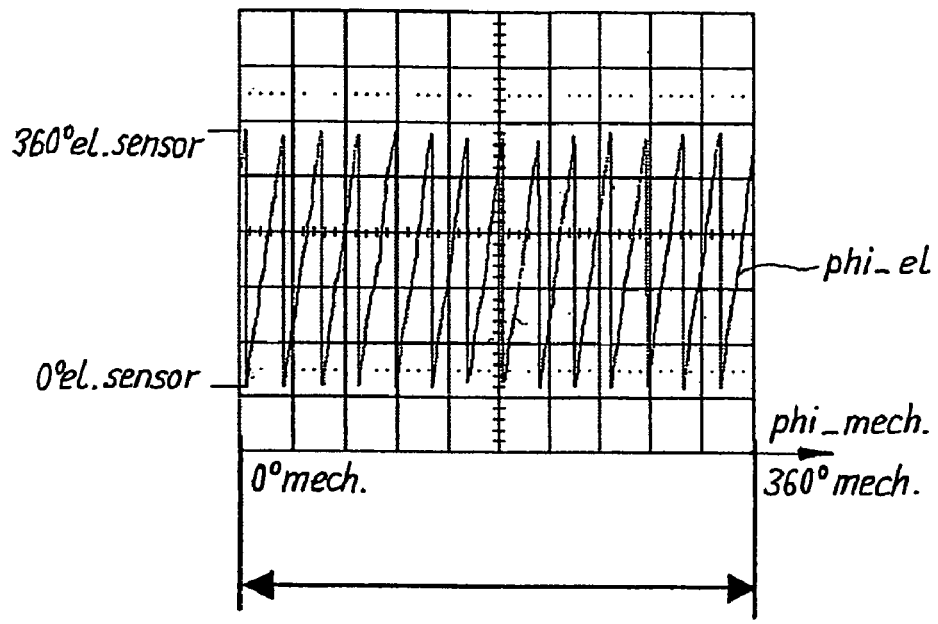
Figure 17:
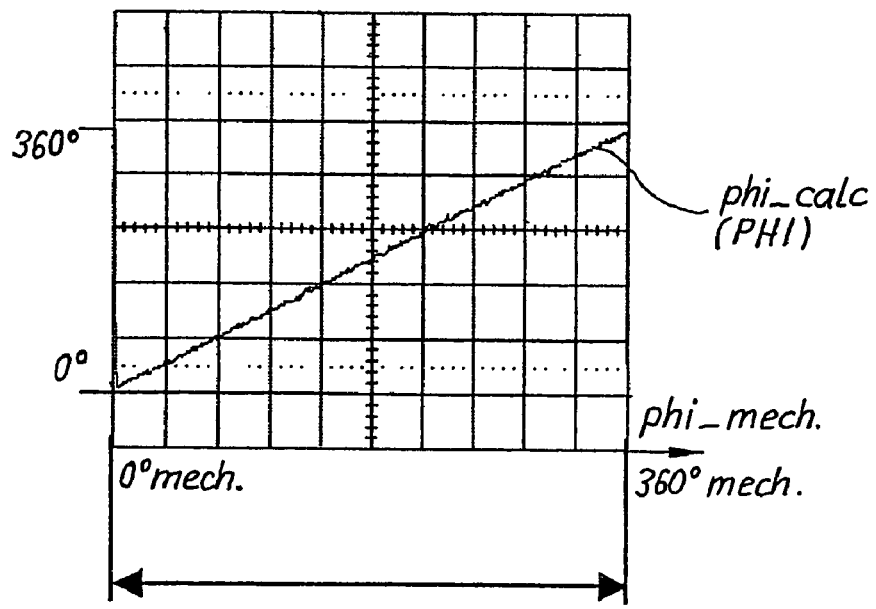
Figure 18:
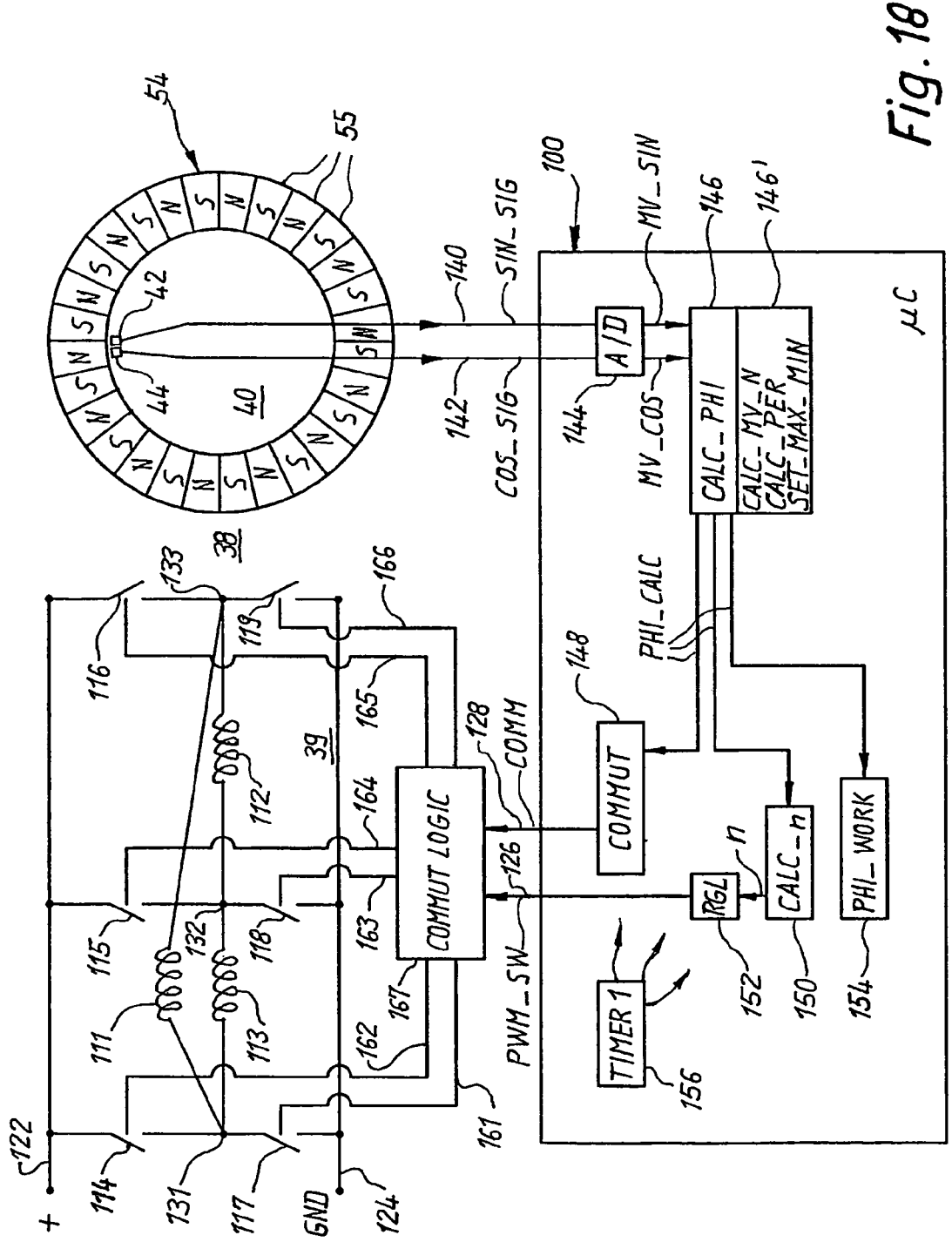
Figure 19:
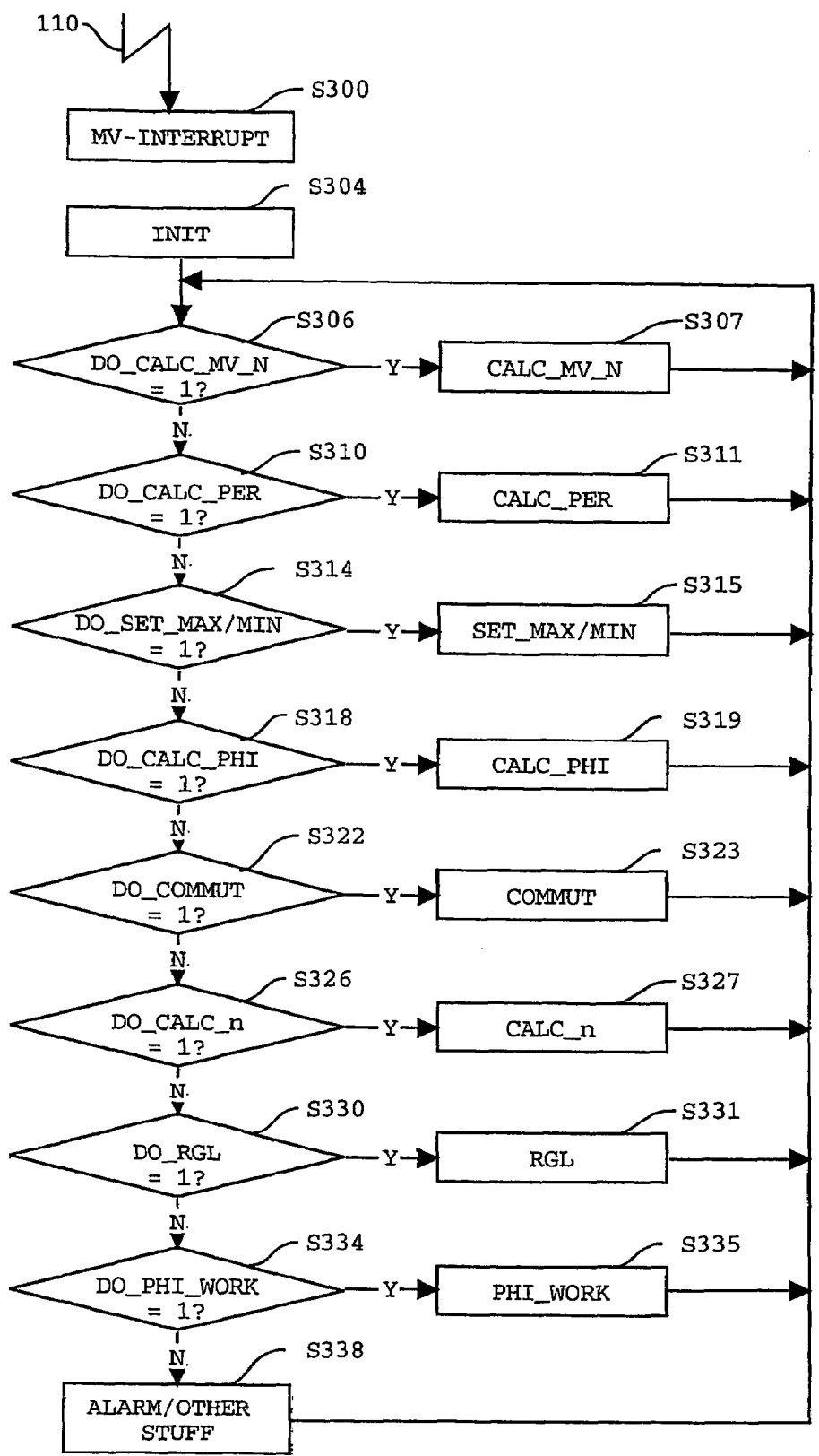
Figure 20:
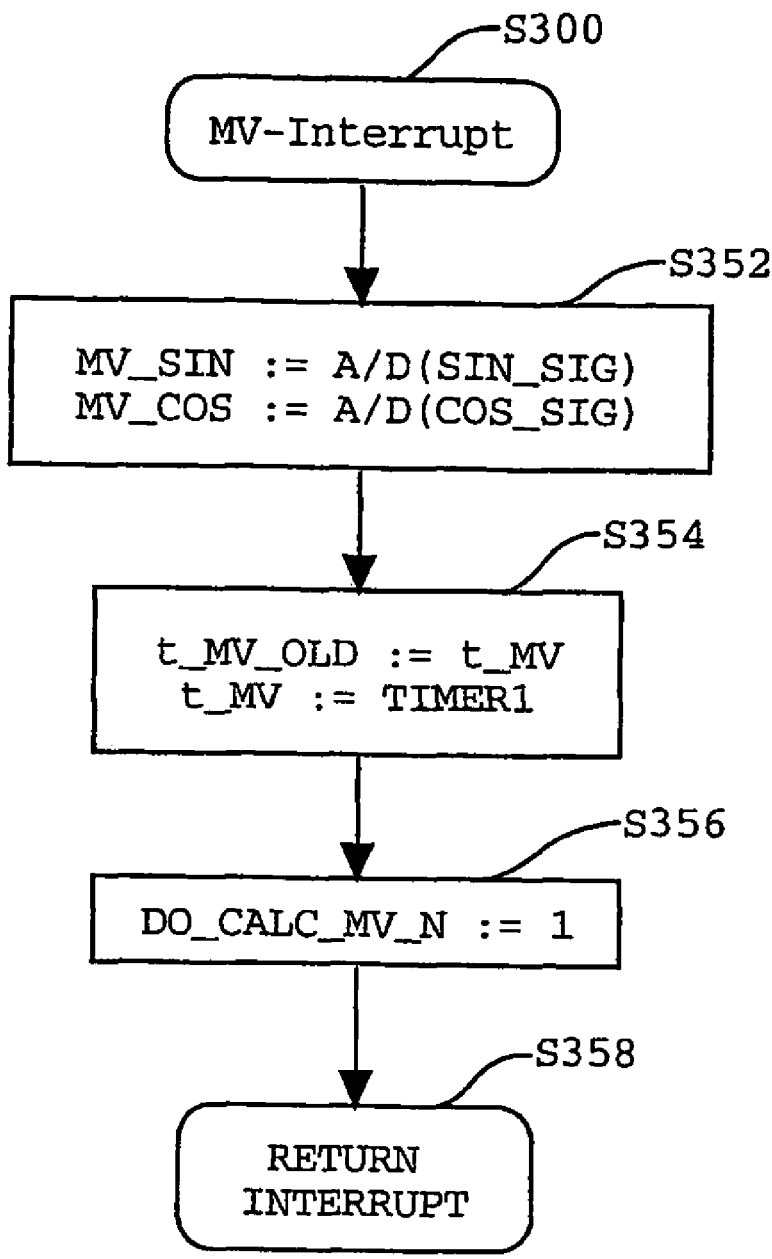
Figure 21:
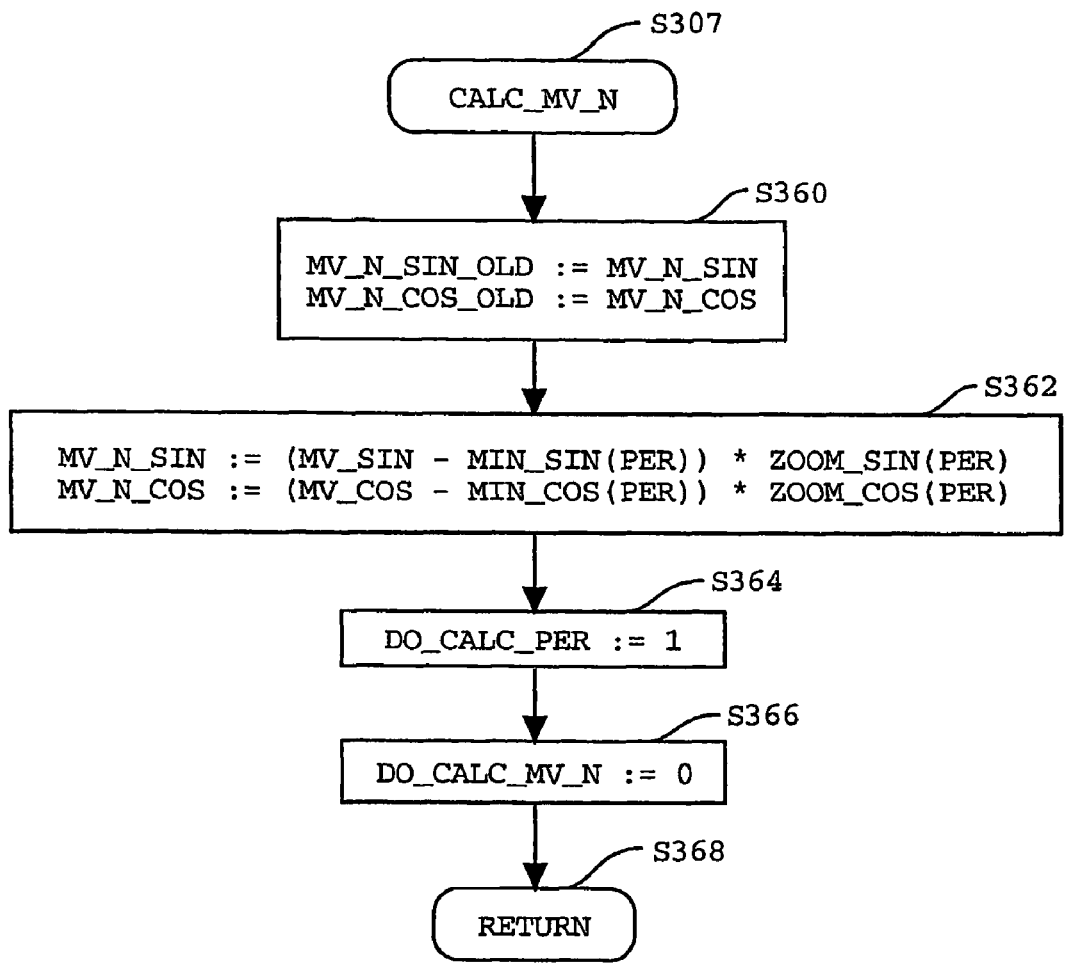
Figure 22:
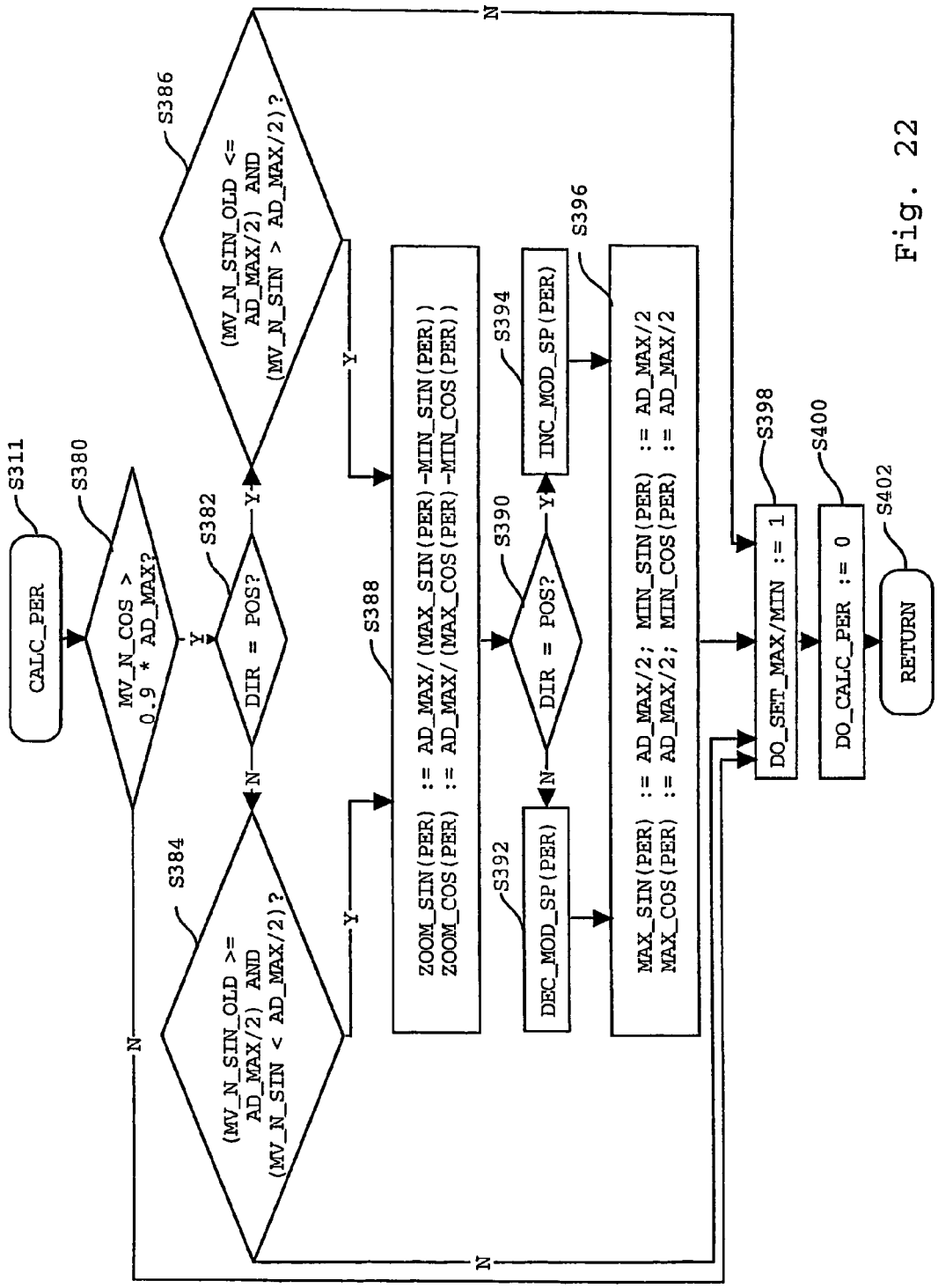
Figure 23:
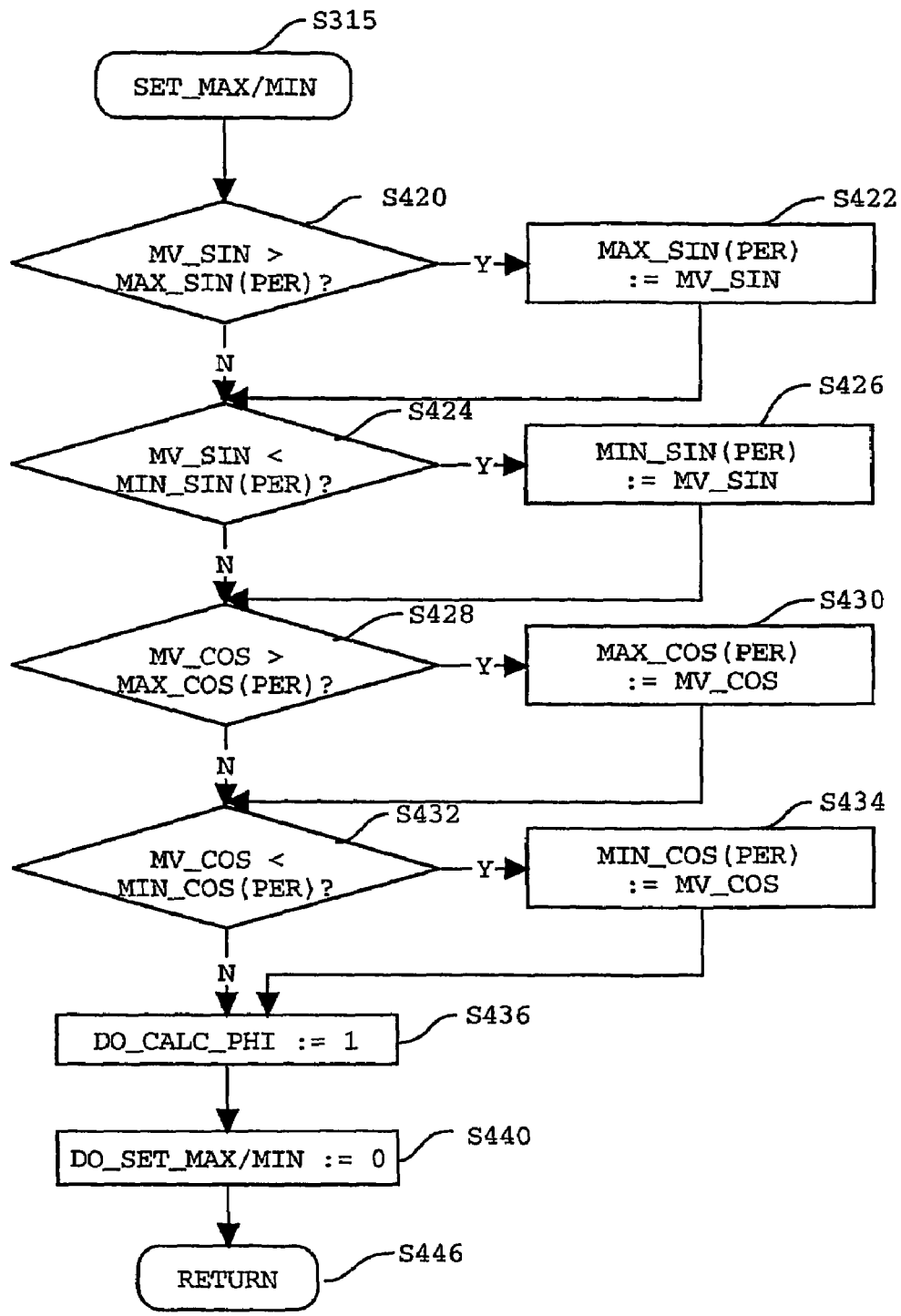
Figure 24:
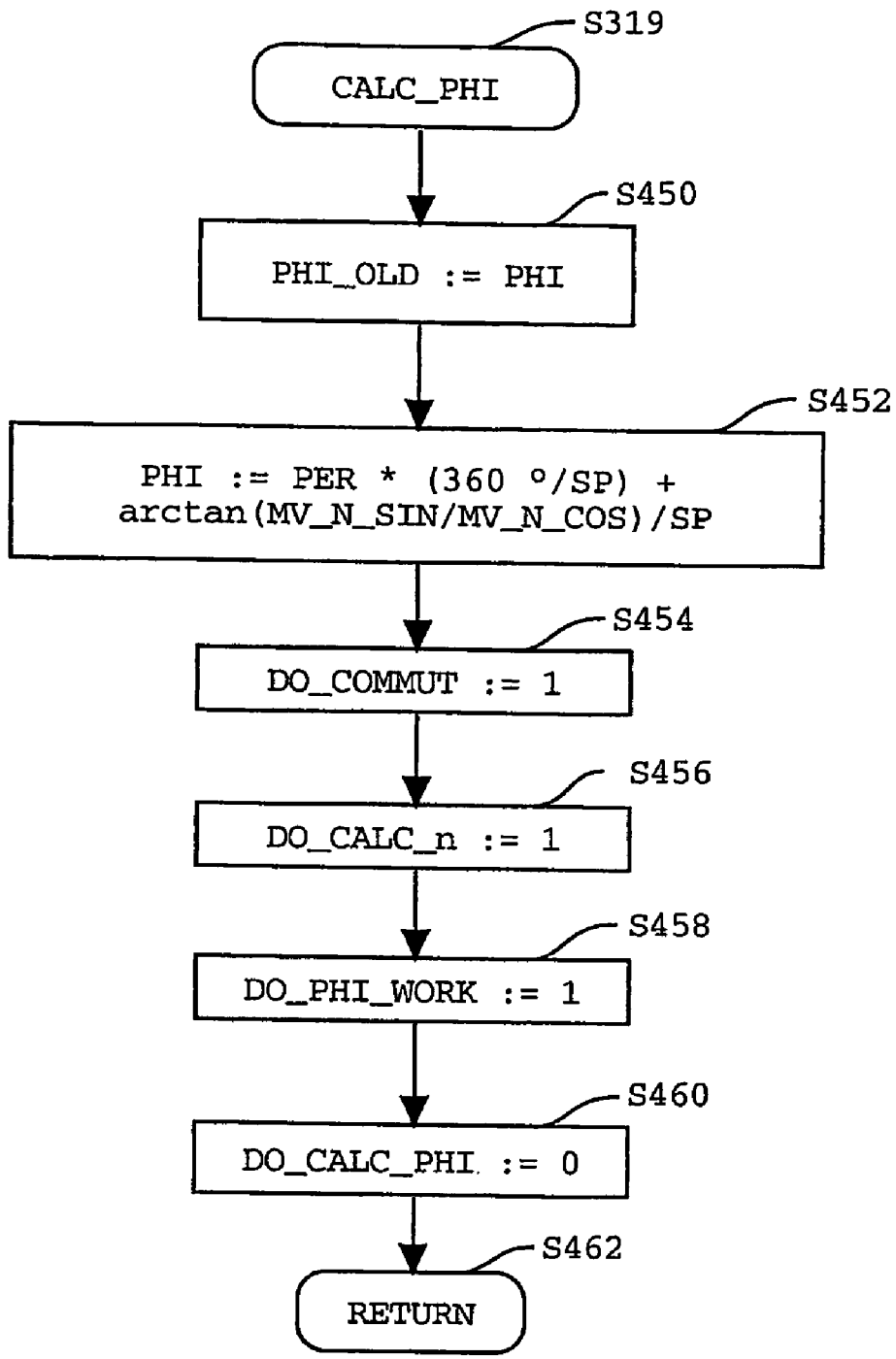
Figure 25:
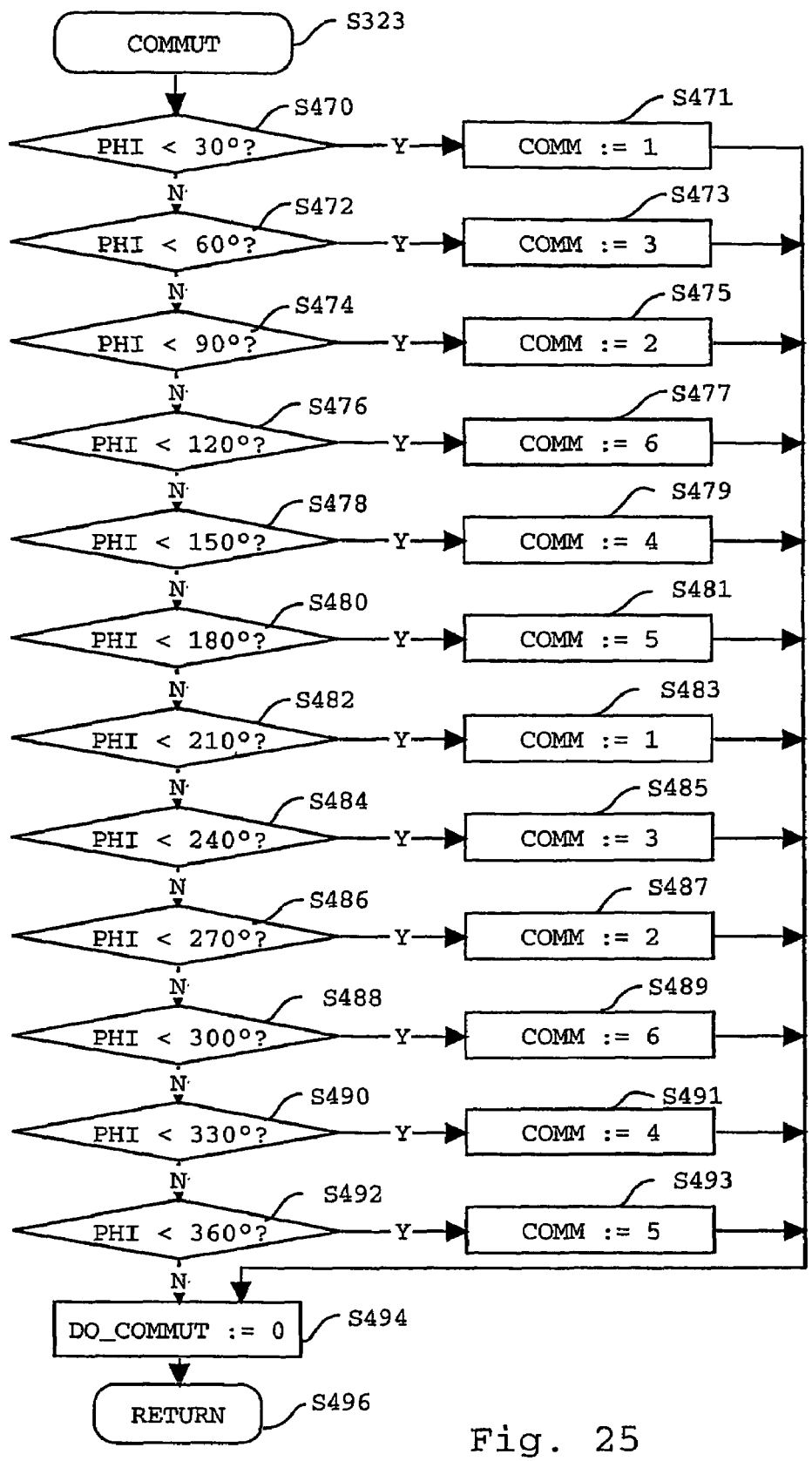
Figure 26:
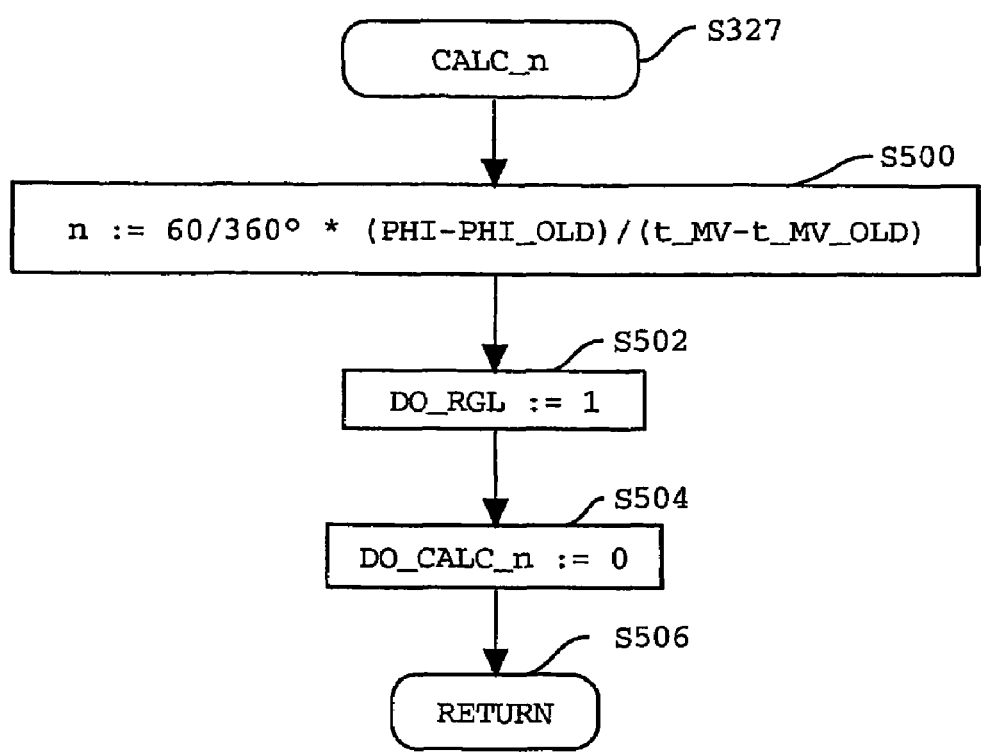
Figure 27:
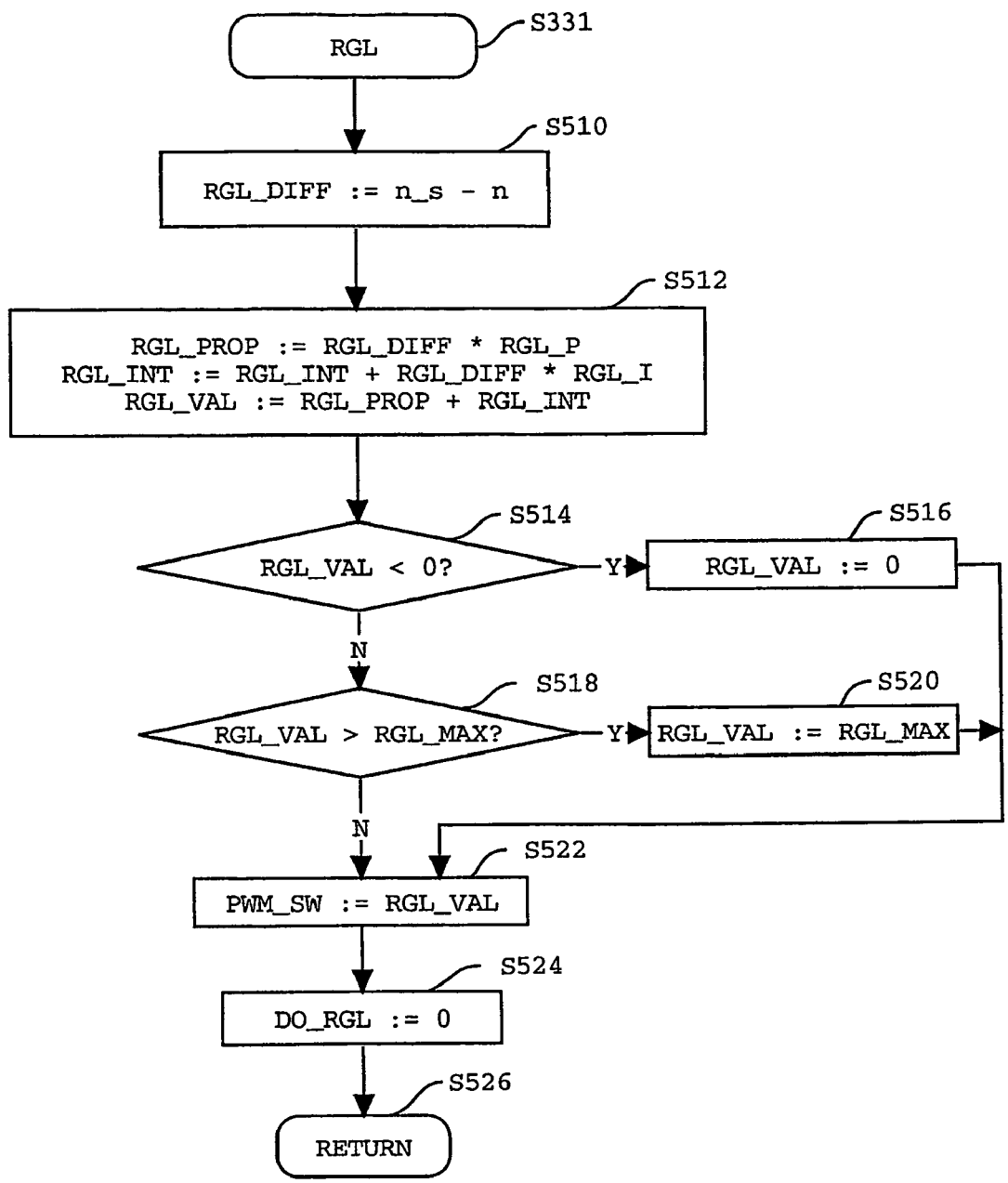
Figure 28:
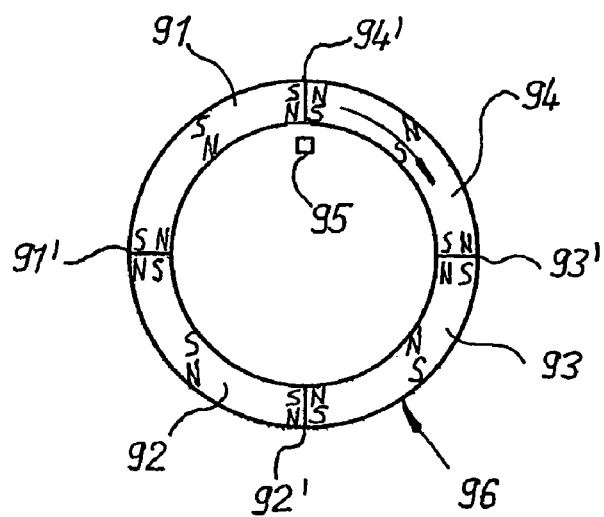
Figure 29:
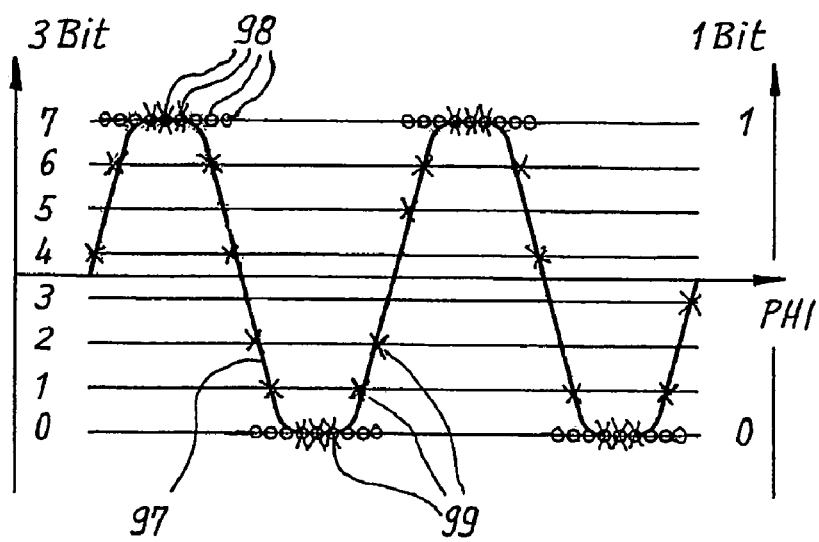

FIG. 14 schematically depicts the rotor position signals and the value PER of the associated period counter;

FIG. 15 schematically depicts the rotor position signals and an associated value phi_el;

FIG. 16 depicts the value phi_el over one rotor position angle range;

FIG. 17 depicts the calculated angle phi_calc;

FIG. 18 schematically depicts a motor according to the present invention;

FIG. 19 shows a configuration of a program for controlling the motor of FIG. 18;

FIG. 20 shows a routine MV-INTERRUPT of the program of FIG. 19;

FIG. 21 shows a routine CALC_MV_N of the program of FIG. 19;

FIG. 22 shows a routine CALC_PER of the program of FIG. 19;

FIG. 23 shows a routine SET_MAX/MIN of the program of FIG. 19;

FIG. 24 shows a routine CALC_PHI of the program of FIG. 19;

FIG. 25 shows a routine COMMUT of the program of FIG. 19;

FIG. 26 shows a routine CALC_n of the program of FIG. 19;

FIG. 27 shows a routine RGL of the program of FIG. 19;

FIG. 28 schematically depicts an external rotor and a rotor position sensor; and FIG. 29 shows a rotor position signal detected by the rotor position sensor of FIG. 28, for both digital and analog sensing.

DETAILED DESCRIPTION

Figure 1:
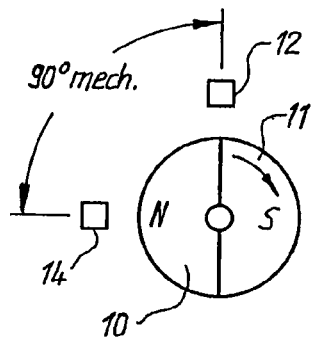

FIG. 1 schematically depicts a two-pole rotor 10 of an internal-rotor motor having a first analog rotor position sensor 12 and a second analog rotor position sensor 14 offset 90° el. and 90° mech.

Figure 2:
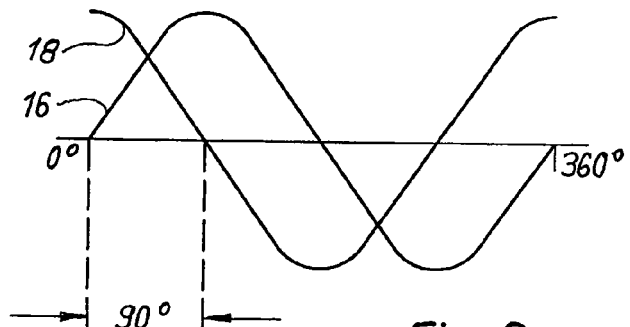

FIG. 2 shows signals 16 and 18 detected by analog rotor position sensors 12, 14 during one rotation of rotor 10 in the direction of arrow 11. A sinusoidal signal 16 is obtained from rotor position sensor 12 and a cosinusoidal signal 18 from rotor position sensor 14.

From signals 16 and 18, the exact position of rotor 10 can be unequivocally ascertained for each position of the rotor and thus at any point in time. This is referred to as an "absolute value sensor."

Figure 3:
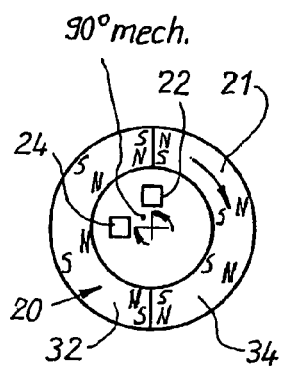

FIG. 3 schematically depicts a two-pole rotor 20 of an external-rotor motor having a first magnet 32 (N=north pole, S=south pole) and a second magnet 34; having a first analog rotor position sensor 22; and having a second analog rotor position sensor 24 offset 90° el. and 90° mech.

Figure 4:
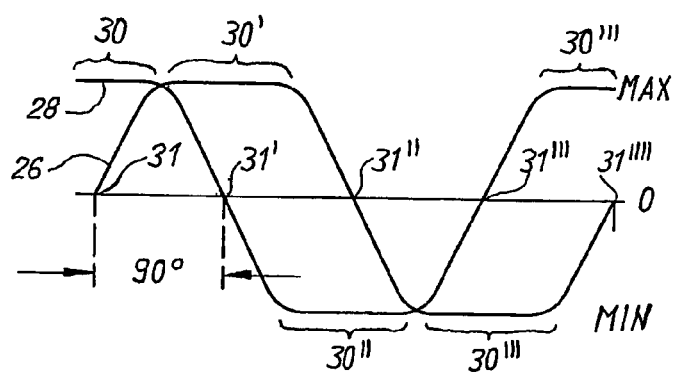

FIG. 4 shows signals 26 and 28 detected by rotor position sensors 22, 24 during one rotation of rotor 20 in the direction of arrow 21. Because of the shape of external-rotor magnets 32, 34 in regions 30, 30', 30", 30''', 30'''', hereinafter called 30, both signal 26 from rotor position sensor 22 and signal 28 of rotor position sensor 24 are flattened around their maximum MAX and minimum MIN ("trapezoidal magnetization"), so that it is difficult, or in extreme cases impossible, to determine the rotor position in these regions 30. Digital Hall sensors are therefore usually used, which furnish a signal that usually changes between a HIGH potential (e.g. +5 V) and a LOW potential (e.g. 0 V), and the changes that take place at the zero transitions 31, 31', 31", 31''', 31'''' of signals 26, 28 are detected.

The shape of signals 26, 28 exhibits flat regions 30 because, for example as depicted in FIG. 3, rotor position sensor 24 "sees" in the adjacent rotor position regions an amount of permanent-magnet material similar in magnitude to that of pole 32, while in the case of rotor position sensor 14 as depicted in FIG. 1, a maximum amount of permanent-magnet material magnetized in the same direction is located in that sensor's vicinity, and that amount decreases upon further rotation.

The use of a sinusoidal magnetization would cause the rotor position signal to be more similar to a sine wave. A motor with sinusoidal magnetization cannot, however, supply as much output as a motor with trapezoidal magnetization.

FIG. 28 is a schematic depiction of an external rotor 96 and a rotor position sensor 95, and FIG. 29 shows the rotor position signal detected by rotor position sensor 95, for both digital and analog sensing.

External rotor 96 of FIG. 28 comprises four poles 91, 92, 93, and 94, between which are located respective interpolar gaps 91', 92', 93', and 94'. Rotor position sensor 95 detects the position of rotor 96, and the corresponding rotor position signal for one complete sensing operation is depicted as line 97 in FIG. 29.

If a digital rotor position sensor 95 and/or an A/D converter having a resolution of one bit is used, the result is measurement points 98 depicted with a circle in FIG. 29, which have either the value 0 or the value 1. These measurement points 98 provide information regarding the current rotor position only in the region of interpolar gaps 91', 92', 93', and 94', since within the angle range of one of poles 91, 92, 93, and 94, the measured value is either continuously 0 or continuously 1.

If, on the other hand, an analog rotor position sensor 95 and an A/D converter having a resolution of at least two bits is used, the result is measurement points 99 depicted with an X in FIG. 29, which reproduce the rotor position signal much more accurately (depending on the resolution of the A/D converter). Measurement points 99 assume different digital values even within the angle range of one pole 91, 92, 93, and 94, so that the rotational position of rotor 96 can be ascertained in those regions as well. The exemplifying embodiment shows the use of a three-bit A/D converter, which can output the eight values from 0 to 7.

Figure 5:
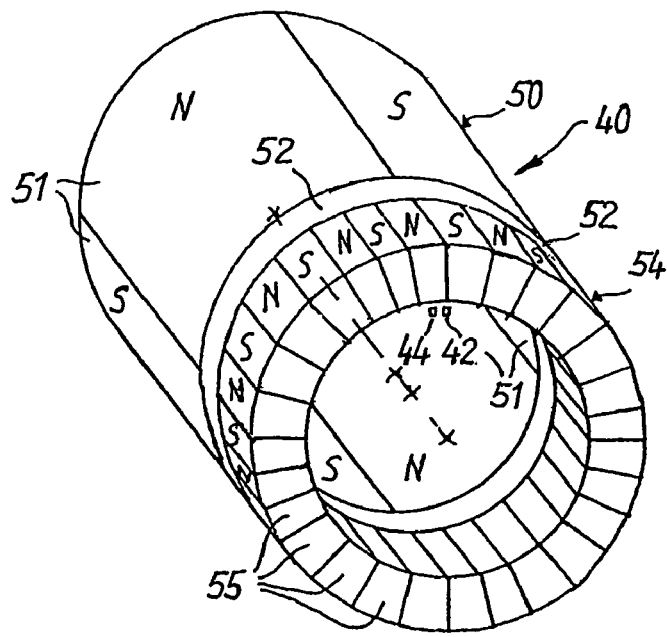
Figure 6:
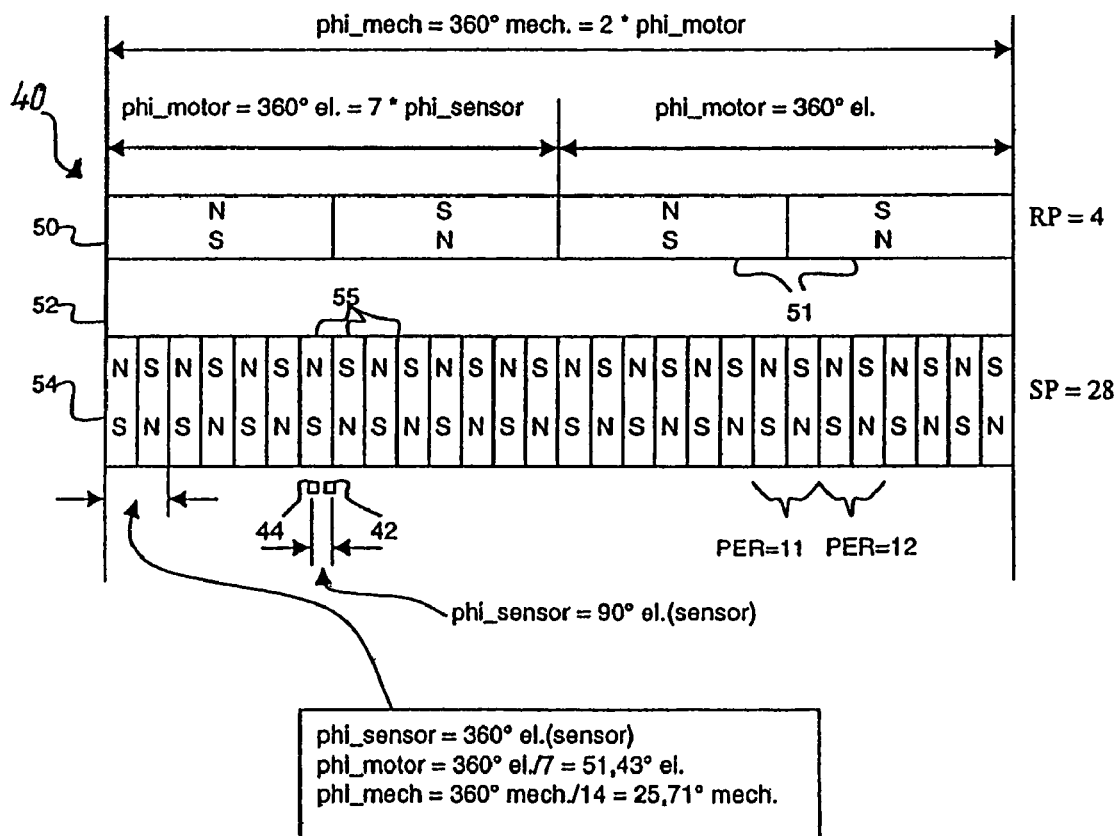

FIG. 5 schematically depicts a rotor 40 of an external-rotor motor, and FIG. 6 shows rotor 40 in a developed depiction. The rotor has a four-pole drive magnet 50 having poles 51; an unmagnetized region 52; and a 28-pole sensor magnet 54 having poles 55; a first analog rotor position sensor 42; and a second analog rotor position sensor 44 offset 90° el.(sensor), which rotor position sensors 42, 44 are associated with sensor magnet 54. The sensor magnet has fourteen pole pairs, and 360° el.(sensor) therefore corresponds to a mechanical angle of 360° mech./14≈25.71° mech. An electrical angle of 90° el.(sensor) thus corresponds to a mechanical angle of approx. 25.71° mech./4=6.43° mech.

Rotor position sensors 42, 44 can also be offset by an angle n*180° el.(sens.)+90° el.(sens.), where n=1, 2, 3, . . . , the sign of the rotor position signal being reversed for n=1, 3, 5, etc.

Figure 7:
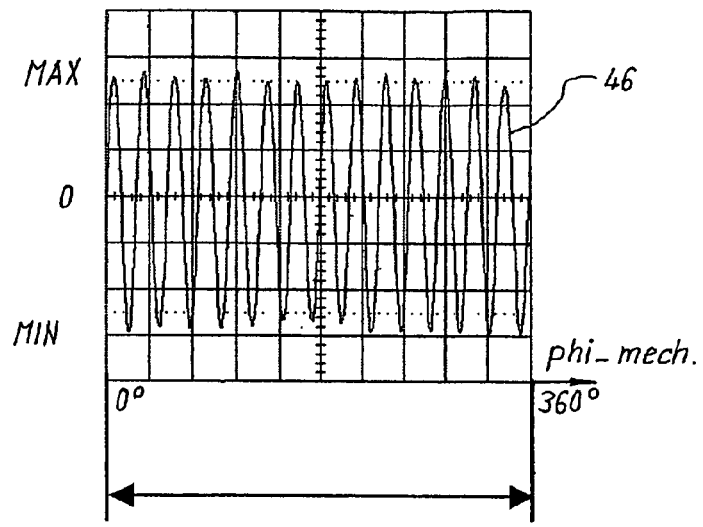

FIG. 7 shows a measurement of signal 46 detected by rotor position sensor 42. Because of the large number of poles, signal 46 is sinusoidal and exhibits fourteen maxima MAX and fourteen minima MIN per revolution (360° mech.) of rotor 40. For reasons of clarity, the cosinusoidal signal 48 of rotor position 44 is not depicted.

Unmagnetized region 52 shown in FIG. 5 and FIG. 6 causes a greater spacing between drive magnet 50 and sensor magnet 54. As a result, signals 46, 48 are less disturbed by the magnetic field of drive magnet 50, and this allows more accurate detection.

Drive magnet 50 and sensor magnet 54 are preferably produced integrally. This is done, for example, by simultaneously magnetizing poles 51 of drive magnet 50 and poles 55 of sensor magnet 54 onto a magnetic material. With small motors in particular, unmagnetized zone 52 can also be omitted.

At each north-to-south (N->S) transition of drive magnet 51, a north-to-south transition of sensor magnet 54 preferably also takes place, so that signals 46, 48 are not weakened by the superposition of the magnetic fields in the region of the respective zero transition.

This is achieved by the fact that sensor magnet 54 comprises an odd number of poles, e.g. 1, 3, 5, 7 in the region of each pole of drive magnet 50.

In the case of a four-pole drive magnet 50 (rotor poles=RP=4), sensor magnet 54 can comprise, for example, 4*7=28 sensor poles (SP=28), or 4*5=20 sensor poles (SP=20); or, in general:

SP=(2n−1)*RP, where n=1, 2, 3.

Because of the large number of poles, the rotor position signal is sinusoidal, even with trapezoidal magnetization, so that a good measurement is possible.

Normalization of Signals

Because of a number of influences, measured signals 46, 48 (see FIG. 7) do not exhibit a perfect sinusoidal or cosinusoidal shape. The discrepancies result, for example, from mechanical eccentricities and production tolerances, superposition of other magnetic fields, expansion of rotor 40 and weakening of the sensor magnet field caused by heat, and signal diminutions occurring at high rotation speed due to limitations in sensor properties.

These discrepancies result in errors in the calculation of the rotor position angle phi. A normalization of signals 46, 48 is therefore performed.

Figures 8, 9:
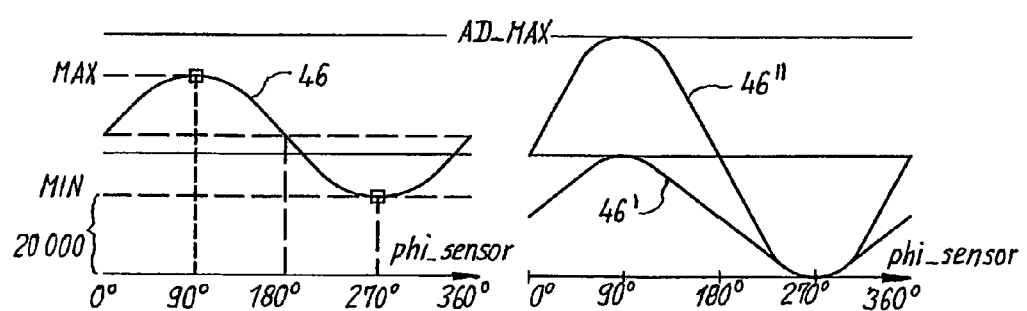

FIG. 8 shows one period (360° el.(sensor)) of sinusoidal signal 46 of FIG. 7 after sensing by an A/D converter, i.e. as a sequence of digital values.

FIG. 9 shows sinusoidal signal 46' after a first normalization step, and sinusoidal signal 46" after a second normalization step.

Figure 10:
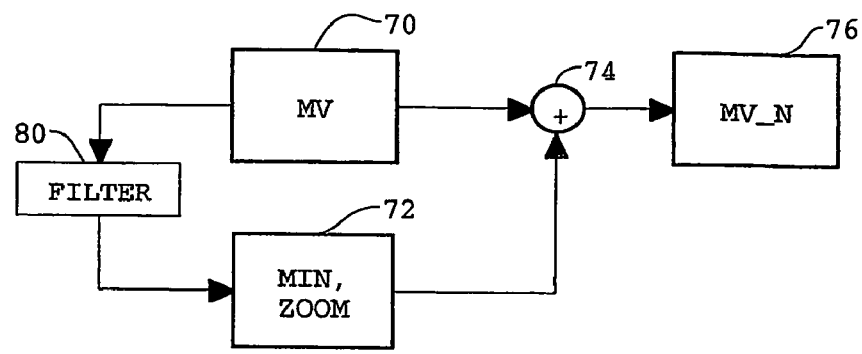

FIG. 10 schematically shows the normalization apparatus for the normalization procedure of FIG. 9.

At each revolution of rotor 40, measured values MV for each period of sinusoidal signal 46 are sensed in a sensing apparatus 70. The maximum MAX and minimum MIN are ascertained from measured values MV in a filter FILTER 80, and both the minimum MIN and a value ZOOM=AD_MAX/(MAX−MIN) are stored in a correction value apparatus 72, AD_MAX being the maximum value of the A/D converter. For a 16-bit A/D converter the value AD_MAX=65,535; for a 10-bit A/D converter AD_MAX=1023.

Upon a subsequent revolution of rotor 40, the following normalization is performed in a calculation apparatus 74 for each measured value MV of sinusoidal signal 46:

MV_N:=(MV−MIN)*ZOOM

Subtraction of the MIN value eliminates DC offset 60 and yields curve 46' in FIG. 9.

Subsequent multiplication by the ZOOM value results in a stretching of curve 46', and is depicted as curve 46". This stretching results on the one hand in a normalization of the amplitudes, and on the other hand in utilization of the entire value range 0 through DIGITAL_MAX of the digital number format being used. This also makes it possible to select a lower value for the resolution of the A/D converter than for the resolution of the digital number format being used.

Normalization Example:

During the previous revolution of rotor 40, values MIN=20,000 and MAX=40,000 were ascertained in the corresponding period. For a 16-bit A/D converter where AD_MAX=65,535 and a 16-bit number format where DIGITAL_MAX=65,535, this results in a ZOOM value=65,535/20,000=3.27675.

During the subsequent revolution of rotor 40, normalization produces the following results:

MV=20,000 becomes MV_N=0
MV=40,000 becomes MV_N=65,535
MV=19,800 becomes MV_N=0 (−655)
MV=41,000 becomes MV_N=65,535 (68,812)
MV=30,000 becomes MV_N=32,768

As is apparent from the results, values that lie outside the value range 0 to AD_MAX, or 0 to DIGITAL_MAX, are limited to that range.

The same normalization is performed (but not depicted) with cosinusoidal signal 48. For normalization in the case of the 28-pole sensor magnet 54 depicted in the exemplifying embodiment, for example, the following number of memory locations is therefore needed:

14 (no. of sensor poles)*2(MIN and ZOOM)*2(cosinusoidal and sinusoidal signal)=56 memory locations.

Storage of the correction values MIN and ZOOM is preferably continuous, since temperature fluctuations, for example, can cause changes in signals 46 and 48.

Figure 11:
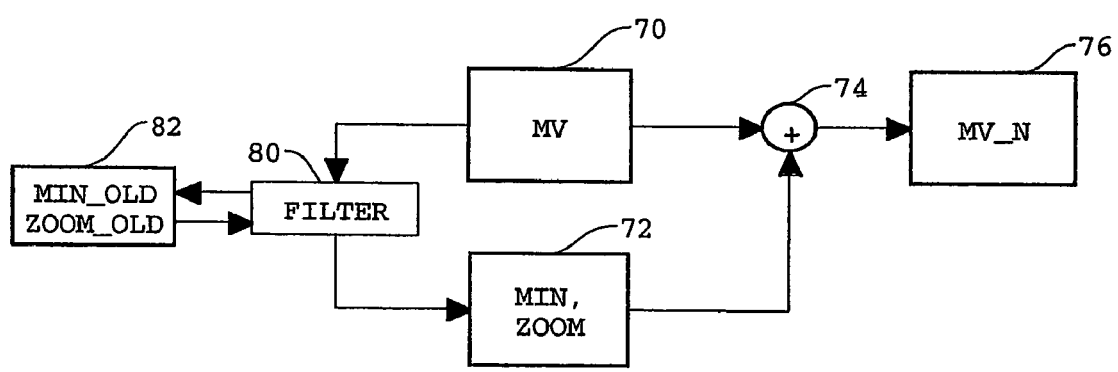

FIG. 11 schematically shows a preferred embodiment of the normalization apparatus of FIG. 10.

In this normalization apparatus, an averaging operation over the respective previous correction values MIN and ZOOM takes place in filter FILTER 80, for example by storing

MIN=0.9*MIN_OLD+0.1*MIN as the new MIN value and

ZOOM=0.9*ZOOM_OLD+0.1*ZOOM as the new ZOOM value. Preferably the ZOOM_OLD and MIN_OLD values are initialized with a predetermined value at startup.

The values MIN_OLD and ZOOM_OLD are temporarily stored in a memory apparatus 82. The averaging operation decreases the effect of greatly divergent measured values.

Alternatively, an averaging of the MIN and MAX values can also take place, from which the ZOOM correction value is also zcalculated.

Figure 12:
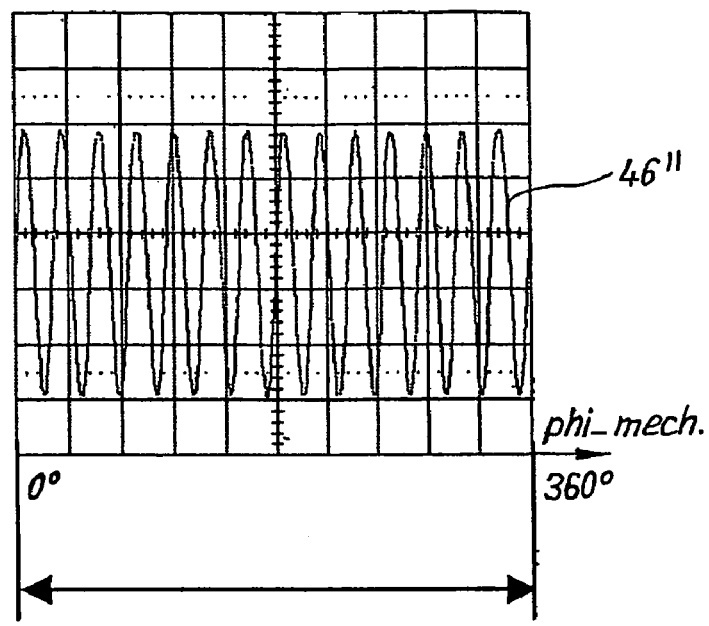
FIG. 12 shows a rotor position signal after normalization.

FIG. 12 shows signal 46" that was derived from normalization of signal 46 and has been outputted on an oscilloscope. The DC offset and vertical position of the signal resulted from the oscilloscope settings. Because of the normalization that was performed, all the amplitudes have approximately the same height.

Calculating the Rotor Position Angle Phi

Figure 13:
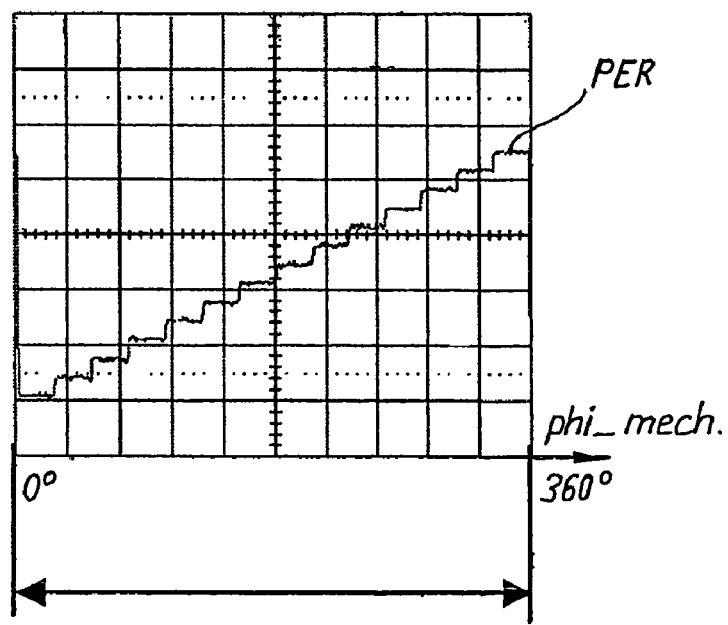
FIG. 13 depicts a period counter over one rotor position angle range.

FIG. 13 depicts the value PER that was outputted on an oscilloscope, and FIG. 14 schematically shows sensing of the individual periods of sinusoidal signal 46 and cosinusoidal signal 48 by means of a period counter PER.

Sinusoidal signal 46 and cosinusoidal signal 48 of the 28-pole sensor magnet 54 depicted in the exemplifying embodiment cycle through fourteen periods for each revolution (360° mech.) of rotor 40, i.e. 14*360° el.(sensor) (see FIG. 6). Period counter PER is incremented by 1 for each period, and after fourteen increments it is reset to the lowest value. It thus cycles through the values 0, 1, 2, 3, . . . 12, 13, 0, . . .

Period counter PER is incremented each time sinusoidal signal 46 exhibits a "zero transition" (approximately at AD_MAX/2; see FIG. 9) and cosinusoidal signal 48 exhibits a maximum (approximately at the value AD_MAX) (see FIG. 14). The result is a stepped signal PER that begins again at the lowest value after every fourteen steps.

The depiction of the value PER that was outputted on an oscilloscope indicates a stepped shape, and at the jumps in the value PER the respective calculated rotor position angle phi_calc is exactly equal to $$\text{phi}_{\_calc} = \text{PER}*(360°/14) = \text{PER}*(360/\text{SP}).$$

FIG. 15 schematically shows the calculation of a value phi_el from sinusoidal rotor position signal 46 and cosinusoidal rotor position signal 48; and FIG. 16 depicts the value phi_el, outputted on an oscilloscope, for one revolution of rotor 40.

The exact angle PHI between the jumps of the value PER can be calculated from sinusoidal signal 46, i.e. MV_SIN=sin(phi) and cosinusoidal signal 48, i.e. MV_COS=cos(phi) (see FIG. 8 and FIG. 9). The equation is:

$$\text{phi}_{\_el} := \arctan(\sin(\text{phi\_sensor})/\cos(\text{phi\_sensor})) = \arctan(\text{MV\_SIN}/\text{MV\_COS}).$$

The calculated angle phi_el cycles through the value range from 0° to 360° el.(sensor) a total of fourteen times, since rotor 40 comprises a sensor magnet 54 having fourteen pole pairs.

Alternatively, a single rotor position sensor 42 can also be used. But because each value can occur twice and is therefore not unequivocal, in this case the previous rotor position signals must be taken into account in order to restore uniqueness.

FIG. 17 depicts the calculated rotor position angle phi_calc outputted on an oscilloscope.

The calculated rotor position angle phi_calc is determined as phi_calc=PER*(360°/14)+phi_el/14, or more generally as phi=PER*(360°/SP)+arc tan(MV_SIN/MV_COS)/SP.

At any rotor position, the exact rotor position angle phi can thus be calculated by counting the periods of the rotor position signal (or signals) and by additionally evaluating the angle information contained in the rotor position signal (or signals), and an absolute value sensor for a motor having an external-rotor sensor magnet is thus obtained.

This would not be possible with digital Hall sensors, since with the latter a change in the rotor position signals occurs only at certain motor positions, and between those changes no further information can be derived from the rotor position signals.

To enable a measurement in both rotation directions for motors that can run in both rotation directions, the rotation direction can be ascertained from the difference phi_el−phi_el_OLD, between the currently ascertained angle phi_el and the angle phi_el_OLD ascertained at the previous measurement. Care must be taken that this determination does not occur at the time of a jump from 360° el. to 0° el. or vice versa.

If the sign of the difference is positive, the motor is running in the "positive" direction. Calculation of the period counter PER is performed as described above.

If the sign of the difference is negative, however, the motor is running in the "negative" direction. To ensure continued correct determination of the rotor position angle with a negative rotation direction, at those points at which the period counter is incremented with a positive rotation direction, it is instead decremented. The calculation of the rotor position angle phi_calc is identical.

FIG. 18 shows a motor 38 according to the present invention having a stator 39, a rotor 40, and a microprocessor or microcontroller μC 100.

Stator 39 comprises three winding terminals 131, 132, 133, connected via respective upper transistors 114, 115 and 116 to a positive line 122 and via respective lower transistors 117, 118 and 119 to a ground line GND 124. Three windings 111, 112 and 113 are connected between each two winding terminals 131, 132 and 133.

Upper transistors 114, 115 and 116 and lower transistors 117, 118 and 119 are connected via control lines 161, 162, 163, 164, 165 and 166 to a commutation logic COMMUT LOGIC 167.

Rotor 40 comprises a sensor magnet 54 having twenty-eight poles 55; a first rotor position sensor 42; and a second rotor position sensor 44 (see FIG. 5 and FIG. 6). Rotor position sensors 42, 44 are connected via lines 140, 142 to μC 100.

μC 100 comprises a timer TIMER1 156; an A/D converter A/D 144; a rotor position calculation arrangement CALC_PHI 146 having auxiliary arrangements 146' (CALC_MV_N, CALC_PER, SET_MAX/MIN); a commutation apparatus COMMUT 148; a rotation speed calculation arrangement CALC_n 150; a controller RGL 152; and a rotor position angle utilization arrangement PHI_WORK 154.

Commutation arrangement COMMUT 148 outputs to commutation logic COMMUT LOGIC 167, via one or more lines 128, a value COMM. The value COMM 128 is determined as a function of the calculated angle PHI_CALC.

As a function of that COMM value, commutation logic COMMUT LOGIC 167 determines which of upper transistors 114, 115 and 116 and lower transistors 117, 118 and 119 are opened and which are closed.

Windings 111, 112 and 113 can thus be energized in both directions; this is referred to as a "full bridge" circuit.

To allow the magnitude of the current flowing through windings 111, 112 and 113 to be controlled or regulated, the upper transistors 114, 115 and 116 or lower transistors 117, 118 and 119 that are to be closed in accordance with COMM signal 128 are triggered via a clocked signal. For that purpose, in addition to COMM signal 128, a value PWM_SW is delivered by controller RGL 152 to commutation logic COMMUT LOGIC 167 via a line 126. The PWM_SW signal is calculated by controller 152, and controls the pulse duty factor.

The energization of stator 39 causes rotor 40 to be driven, and rotor position sensors 42, 44 that are arranged in the vicinity of sensor magnet 54 generate analog rotor position signals SIN_SIG and COS_SIG that are transferred via lines 140, 142 to A/D converter A/D 144.

A/D converter A/D 144 converts signals SIN_SIG and COS_SIG into digital values MV_SIN and MV_COS having a resolution of at least two bits.

The values MV_SIN and MV_COS are delivered to rotor position calculation arrangement CALC_PHI 146 which calculates therefrom, with the aid of auxiliary arrangement 146', an absolute value PHI_CALC that corresponds to the instantaneous rotor position.

The calculated absolute value PHI_CALC is delivered to commutation arrangement COMMUT 148 for determination of the commutation time, to rotation speed calculation arrangement CALC_n 150 for determination of the rotation speed n, and to rotor position angle utilization arrangement PHI_WORK 154 for further utilization of the calculated angle PHI_CALC.

Rotation speed calculation arrangement CALC_n 150 calculates the rotation speed n of rotor 40, and the value n is delivered to controller 152 which calculates therefrom a control input PWM_SW. Control input PWM_SW is outputted via line 126 to commutation logic COMMUT LOGIC 167, and determines the pulse duty factor of the clock timing for upper transistors 114, 115 and 116 and lower transistors 117, 118 and 119.

Further tasks that require the absolute value PHI_CALC are performed in arrangement PHI_WORK 154.

Timer TIMER1 156 controls, for example via interrupts, the particular point in time for A/D conversion using A/D converter A/D 144.

FIG. 19 shows the structure of the program executing in μC 100.

The program contains an interrupt routine MV-INTERRUPT S300 that is called by an interrupt 110, for example, every 100 μs, i.e. at regular, predetermined intervals.

In S304 an initialization occurs in which, for example, the variables are initialized. In addition, windings 111, 112 and/or 113 are energized with a predetermined energization pattern so that rotor 40 is rotated into a defined initial state. With a four-pole rotor magnet 50, two positions offset 180° mech. from one another are magnetically equivalent, so that here the initial state corresponds to either one or the other rotor position.

Alternatively, the sensor magnet can comprise a marking to allow assignment of the rotor position. If this initial energization were not performed, the relative rotation angle would be known, but not the absolute electrical angle of rotor magnet 50 needed for commutation.

A main loop then begins at S306. In S306 a flag DO_CALC_MV_N is polled; if it is equal to 1 (Y=Yes), a routine CALC_MV_N S307 is called, and execution then branches back to beginning S306 of the main loop.

In similar fashion, S310 checks whether routine CALC_PER S311 has been requested, S314 whether routine SET_MAX/MIN S315 has been requested, S318 whether routine CALC_PHI S319 has been requested, S322 whether routine COMMUT S323 has been requested, S326 whether routine CALC_n S327 has been requested, S330 whether routine RGL S331 has been requested, and S334 whether routine PHI-WORK S335 has been requested; lastly, in S338 an ALARM routine and further routines necessary for operation of the motor are executed.

FIG. 20 shows the interrupt routine MV-INTERRUPT S300 that is called, for example every 100 μs, by interrupt 110 (see FIG. 19).

The routine MV-INTERRUPT S300 encompasses both the signals SIN_SIG 140 and COS_SIG 142 (see FIG. 18) and the current time.

In S352, the instantaneous values of signals SIN_SIG 140 and COS_SIG 142 are read in via A/D converter 144, and are assigned to variables MV_SIN and MV_COS.

In S354, the value of variable t_MV from the last measurement is assigned to the variable t_MV OLD, so that it is available for further calculations. The instantaneous value from timer TIMER1 144 is read out and stored in the variable t_MV.

In S356 the variable DO_CALC_MV_N is set to 1, thereby requesting the routine CALC_MV_N S307.

FIG. 21 shows the routine CALC_MV_N S307 that performs a normalization of the measured values.

In S360 the values of variables MV_N_SIN and MV_N_COS are stored in variables MV_N_SIN_OLD and MV_N_COS_OLD for further calculations.

In S362 a normalization is performed (see description of FIG. 8 and FIG. 9). For this, a variable MIN_SIN(PER), ZOOM_SIN(PER), MIN_COS(PER), ZOOM_COS(PER) is stored for each value of period counter PER. The results of the normalizations are stored in variables MV_N SIN and MV_N_COS.

In S364 the routine CALC_PER S311 is requested by setting DO_CALC_PER to 1, and in S366 the variable DO_CALC_MV_N is reset to zero.

Execution leaves the routine CALC_MV_N S307 at S368.

FIG. 22 shows the routine CALC_PER S311 that determines the period in which rotor 40 (FIG. 18) is located, and performs the necessary steps in the context of a period change.

S380 checks whether the variable MV_N_COS is greater than 0.9*AD_MAX, i.e. whether the signal COS_SIG is close to its maximum (see description of FIG. 12).

If yes (Y), in S382 the rotation direction DIR of rotor 40 is checked. If it is negative, S384 then checks whether the old normalized measured value MV_N_SIN_OLD was greater than or equal to the value AD_MAX/2, and whether the current normalized measured value MV_N_SIN is less than the value AD_MAX/2. This corresponds to a check as to whether the signal SIN_SIG 140 has a zero transition from the positive into the negative range (see description of FIG. 12).

If Yes, then a period change has taken place, and execution branches to S388. If No, a period change has not taken place, and execution branches to S398.

For a positive (POS) rotation direction DIR of rotor 40, S386 similarly checks whether the signal SIN_SIG 140 has a zero transition from the negative into the positive range (see description of FIG. 12).

If Yes, then a period change has taken place, and execution branches to S388. If No, a period change has not taken place, and execution branches to S398.

In S388, i.e. after a period change, the values of variables ZOOM_SIN(PER) and ZOOM_COS(PER) for the last period are set to the value just calculated (see description of FIG. 8 and FIG. 9).

What occurs in S392 and S394, depending on the rotation direction DIR of rotor 40, is respectively a decrementing of the value of variable PER with the routine DEC_MOD_SP or an incrementing of the value of variable PER with the routine INC_MOD_SP.

The routine DEC_MOD_SP decreases the value of variable PER in consideration of the modulo function of SP. Assuming multiple calls of DEC_MOD_SP and a sensor pole number SP=14, PER thus, for example, cycles through the values 4, 3, 2, 1, 0, 13, 12, . . . 1, 0, 13, . . .

In similar fashion, assuming multiple calls of INC_MOD_SP where SP=14, PER cycles through the values 12, 13, 0, 1, 2, . . . , 12, 13, 0, . . .

The value (PER*360°/SP) therefore accurately indicates, for both rotation directions, the rotor position angle phi at the time of the period change.

In S396 the variables MAX_SIN(PER), MIN_SIN(PER), MAX_COS(PER), MIN_COS(PER) are reset to the average value AD_MAX/2 so that new maximum and minimum values can be determined for the new period.

In S398 the routine SET_MAX/MIN S315 is requested by setting DO_SET_MAX/MIN to 1, and in S400 the request for CALC_PER S311 is reset.

Execution leaves the routine CALC_PER S311 at S402.

FIG. 23 shows the routine SET_MAX_MIN S315 that determines and stores the maximum and minimum values of measured values MV_SIN and MV_COS.

S420 checks whether the measured value MV_SIN is greater than the value MAX_SIN(PER), i.e. the maximum value of MV_SIN so far in that period PER. If Yes, then in S422 MAX_SIN(PER) is set to the value MV_SIN.

S424 checks whether the measured value MV_SIN is less than the value MIN_SIN(PER), i.e. the minimum value of MV_SIN so far in that period PER. If Yes, then in S426 MIN_SIN(PER) is set to the value MV_SIN.

The values MAX_COS(PER) and MIN_COS(PER) are set in similar fashion in steps S428, S430, S432, and S434.

In S436 DO_CALC_PHI is set to 1 (request), and in S440 the request flag DO_SET_MAX/MIN is reset.

Execution leaves the routine at S446.

FIG. 24 shows the routine CALC_PHI S319 that calculates the rotor position angle phi.

In S450 the value of the variable PHI is stored in the variable PHI_OLD for further calculations.

In S452 the rotor position angle phi is calculated and stored in the variable PHI (see description of FIG. 14). Calculation of the arctan function can also be replaced by readout from a table that, for example, assigns a function value to each pair (MV_N_SIN, MV_N_COS).

In S454, S456, and S458 the routines COMMUT S323, CALC_n S331, and PHI_WORK S331 are requested by setting the corresponding request flags.

In S460 the request flag DO_CALC_PHI is reset, and execution leaves the routine at S462.

FIG. 25 shows the routine COMMUT S323 that determines, as a function of the calculated mechanical rotor position angle PHI for a four-pole rotor magnet 50, which of the phases 111, 112 and/or 113 of a three-phase stator 39 is energized (see FIG. 18).

S470 checks whether the value PHI is less than 30°. If Yes, the variable COMM is set to a value of 1. This corresponds to the commutation pattern necessary for the angle range 0°<=PHI<30°, and the corresponding phases 111, 112 and/or 113 are energized via commutation logic COMMUT LOGIC 167.

In steps S472 through S493, the commutation pattern COMM is set in similar fashion to the necessary value at angular intervals of 30 degrees. Because the value PHI reflects the rotor position at every point in time, commutation requires no time measurement, such as would be necessary in a motor without an absolute value sensor.

In S494 the request flag DO_COMMUT is reset, and execution leaves the routine at S496.

FIG. 26 shows the routine CALC_n S327 that calculates the rotation speed n of the motor.

In S500 the rotation speed n is calculated, as follows:

$$n=60/360°*(PHI-PHI\_OLD)/(t\_MV-t\_MV\_OLD).$$

The rotation speed n is proportional to the quotient of the angular difference between angle PHI at measurement time t_MV and angle PHI_OLD at measurement time t_MV_OLD, and the time difference between measurement time t_MV of the current measurement and measurement time t_MV_OLD of the previous measurement. The factor 60/360° defines the unit as revolutions per minute.

If the measurement is performed at fixed time intervals, the value t_MV−t_MV_OLD is constant and can be replaced by a constant (see interrupt 110 in FIG. 19).

The above relationship is derived from $$n=60/(2*Pi)w=60/(2*Pi)d/dtPHI(t),$$

where w is the angular velocity and PHI is to be indicated in radians.

Throughout the program, the value PHI can alternatively be indicated as an angle value, in radians, or in another unequivocally assignable form.

In S502 the control routine RGL is requested by setting the request flag to 1.

In S504 the request flag for the routine CALC_n is reset, and execution leaves the routine CALC_n at S506.

FIG. 27 shows the routine RGL S331 that calculates control input PMW_SW for setting the requisite pulse duty factor (see FIG. 18).

In S510 the system deviation RGL_DIFF is calculated from the difference between target value n_s and true value n.

In S512 the control input RGL_VAL, with proportional component RGL_PROP and integral component RGL_INT, is calculated using an ordinary PI controller. The magnitudes of the components are determined by the factors RGL_P and RGL_I. The equations for calculating RGL_PROP and RGL_INT are indicated.

S514 checks whether control input RGL_VAL is less than zero. If Yes, in S516 it is set to the lowest possible pulse duty factor 0.

S518 checks whether control input RGL_VAL is greater than RGL_MAX. If Yes, in S520 it is set to the highest possible pulse duty factor RGL_MAX.

In S522, control input RGL_VAL is assigned to the output value PWM_SW which determines the pulse duty factor and thus the magnitude of the winding current.

In S524, the request flag for the routine RGL is reset, and execution leaves the routine RGL at S526.

Many variants and modifications are, of course, possible within the scope of the present invention.

The invention claimed is:

1. A method for operating an electric motor, which motor comprises
   a stator (39);
   an external rotor (40), which external rotor (40) comprises a sensor magnet (54) having a plurality of sensor poles (55);
   at least one rotor position sensor (42, 44), connected to the stator; and
   a rotor position evaluation arrangement (100);
   which method comprises the following steps:
   A) generating, with the at least one rotor position sensor (100), at least one rotor position signal dependent on the rotational position of the sensor magnet (54);
   B) delivering the at least one rotor position signal to the rotor position evaluation arrangement (100); and
   C) converting the at least one rotor position signal, in the rotor position evaluation arrangement (100), into at least one digital value having a resolution of at least two bits, with the result that the at least one rotor position signal can be converted into different digital values even at rotational positions within the angle range of one sensor pole.

2. The method according to claim 1, further comprising generating the at least one rotor position signal as an analog rotor position signal.

3. The method according to claim 1,
   further comprising generating the at least one rotor position signal in the rotor position evaluation arrangement (100) into at least one digital value having a resolution of at least four bits.

4. The method according to claim 2,
   further comprising converting the at least one rotor position signal in the rotor position evaluation arrangement (100) into at least one digital value having a resolution of at least eight bits.

5. The method according to claim 1,
   further comprising performing said rotor position sensor signal generating step continuously.

6. The method according to claim 1,
   further comprising continuously performing said rotor position signal delivering step.

7. The method according to claim 1,
   further comprising repeating, at intervals in time, said rotor position signal converting step.

8. The method according to claim 1, further comprising repeating,
   at fixed intervals in time, said rotor position signal converting step.

9. The method according to claim 7,
   further comprising converting the at least one digital value into a value within a predetermined value range.

10. The method according to claim 9,
    further comprising normalizing said at least one digital value by ascertaining at least one correction value and storing said correction value during a respective previous revolution of the external rotor (40).

11. The method according to claim 10,
    further comprising calculating an average of a current correction value and at least one previous correction value.

12. The method according to claim 7,
    further comprising calculating a rotational position of the external rotor (40) based upon the at least one digital value.

13. The method according to claim 12,
    further comprising
    ascertaining a count of periods through which at least one of the rotor position signals has cycled, based upon the at least one digital value.

14. The method according to claim 13,
    further comprising
    resetting, to a predetermined value, said count of periods, after sensing of a predetermined number of periods.

15. The method according to claim 13,
further comprising
calculating a rotational position of the external rotor (40) based upon the ascertained number of periods and the at least one digital value.

16. The method according to claim 12,
further comprising
obtaining rotor position output signals from two rotor position sensors, digitizing said output signals, and
using said digitized output signals in calculating the rotational position of the external rotor (40).

17. The method according to claim 12
further comprising
E) ascertaining the rotation speed of the external rotor from the
calculated rotational position of the external rotor at a first point in time and the
calculated rotational position of the external rotor at a second point in time.

18. The method according to claim 12,
further comprising
F) ascertaining the rotation direction of the external rotor (40) from the change over time in the at least one digital value.

19. The method according to claim 12,
further comprising:
G) upon startup of the electric motor, bringing the external rotor (40) into a defined initial position.

20. The method according to claim 19,
further comprising:
upon startup, bringing the external rotor (40) into the defined initial position by an energization of the stator (39).

21. An electric motor comprising
a stator (39);
an external rotor (40) with a sensor magnet (54) having a plurality SP of sensor poles (55);
at least one rotor position sensor (42, 44) for generating a rotor position signal (140, 142); and
a rotor position evaluation apparatus (100) for generating an absolute value for the rotor position, including an A/D converter (144) having a resolution of at least two bits,
wherein said at least one rotor position sensor (42, 44) has an output which is connected to an input of the A/D converter (144).

22. The electric motor according to claim 21, wherein the at least one rotor position sensor (42, 44) is implemented as an analog rotor position sensor.

23. The electric motor according to claim 21,
wherein the rotor position evaluation apparatus (100) is implemented as an absolute value sensor (100) for the rotor position, which sensor can indicate the position of the rotor at any point in time by means of an evaluation of the rotor position signal.

24. The electric motor according to claim 21,
wherein the A/D converter (144) has a resolution of at least four bits.

25. The electric motor according claim 21, wherein the A/D converter (144) has a resolution of at least eight bits.

26. The electric motor according to claim 21,
wherein a microprocessor (100) constitutes at least a part of the rotor position evaluation arrangement (100).

27. The electric motor according to claim 21,
wherein the at least one rotor position sensor (42, 44) is arranged on the radially inner side of the sensor magnet (54).

28. The electric motor according to claim 21,
which comprises two rotor position sensors (42, 44) that are arranged at a spacing of n*180 el.+90° el., where n=0, 1, 2, 3, 4, . . .

29. The electric motor according to claim 21,
wherein the sensor magnet a number SP of sensor poles greater than or equal to ten.

30. The electric motor according to claim 21,
wherein the external rotor (40) comprises a sensor magnet (54) and a rotor magnet (50) interacting with the stator (39), which rotor magnet has a plurality RP of rotor poles such that RP<SP.

31. The electric motor according to claim 30, the rotor magnet (50) having a trapezoidal magnetization.

32. The electric motor according to claim 30,
the external rotor (40) comprising an unmagnetized region (52) between the rotor magnet (50) and the sensor magnet (54).

33. The electric motor according to claim 30,
wherein the expression governing the number SP of sensor poles is
SP=(2n−1)*RP, where n=1, 2, 3, 4, . . .

34. The electric motor according to claim 33, where n>=2.

35. The electric motor according to claim 33, where n>=3.

36. The electric motor according to claim 33, where n>=4.

37. The electric motor according to claim 30, wherein
the external rotor is so configured that, at the angular locations at which the rotor magnet (50) exhibits a change in magnetic field direction, the sensor magnet (54) likewise exhibits a change in magnetic field direction.

38. The electric motor according to claim 37, wherein the change in magnetic field direction for both the sensor magnet (54) and the rotor magnet (50) occurs in the same direction at those angular locations.

39. The electric motor according to claim 30, wherein
the rotor magnet (50) and sensor magnet (54) are formed integrally.

* * * * *

UNITED STATES PATENT AND TRADEMARK OFFICE
CERTIFICATE OF CORRECTION

| | | |
|---|---|---|
| PATENT NO. | : 7,049,776 B2 | Page 1 of 1 |
| APPLICATION NO. | : 10/533265 | |
| DATED | : May 23, 2006 | |
| INVENTOR(S) | : Jorg Hornberger et al. | |

It is certified that error appears in the above-identified patent and that said Letters Patent is hereby corrected as shown below:

Under Foreign Patent Documents, Page 2 of Patent Title Page (56), "137 38 344" Should be --197 38 344--

In column 6, line 3 "zcalculated" should be --calculated--

In column 6, line 34, "phi$_{calc}$" should be --phi_calc--

In column 6, line 45, "phi$_{el}$" should be --phi_el--

In column 9, line 30, "MV_N SIN" should be --MV_N_SIN--

Signed and Sealed this

Sixth Day of January, 2009

JON W. DUDAS
*Director of the United States Patent and Trademark Office*